(12) United States Patent
Ahearn

(10) Patent No.: US 9,300,949 B2
(45) Date of Patent: Mar. 29, 2016

(54) MULTI-VIEW SYSTEM

(76) Inventor: David J. Ahearn, Little Compton, RI (US)

( * ) Notice: Subject to any disclaimer, the term of this patent is extended or adjusted under 35 U.S.C. 154(b) by 2466 days.

(21) Appl. No.: 12/021,657

(22) Filed: Jan. 29, 2008

(65) Prior Publication Data

US 2008/0180521 A1 Jul. 31, 2008

Related U.S. Application Data

(60) Provisional application No. 60/886,980, filed on Jan. 29, 2007.

(51) Int. Cl.
*H04N 13/00* (2006.01)
*H04N 13/04* (2006.01)
*G02B 27/01* (2006.01)

(52) U.S. Cl.
CPC .......... *H04N 13/044* (2013.01); *G02B 27/0172* (2013.01); *G02B 2027/0154* (2013.01); *G02B 2027/0161* (2013.01)

(58) Field of Classification Search
None
See application file for complete search history.

(56) References Cited

U.S. PATENT DOCUMENTS

| | | | | |
|---|---|---|---|---|
| 4,651,201 A | * | 3/1987 | Schoolman | 348/45 |
| 4,944,583 A | * | 7/1990 | Jennings | 351/45 |
| 5,003,300 A | * | 3/1991 | Wells | 348/115 |
| 5,251,333 A | | 10/1993 | Tsook | |
| 5,642,221 A | * | 6/1997 | Fischer et al. | 348/53 |
| 5,646,783 A | | 7/1997 | Banbury | |
| 5,682,172 A | * | 10/1997 | Travers et al. | 348/53 |
| 5,900,849 A | | 5/1999 | Gallery | |
| 6,016,160 A | * | 1/2000 | Coombs et al. | 348/61 |
| 6,150,998 A | * | 11/2000 | Travers et al. | 348/53 |
| 6,160,666 A | | 12/2000 | Rallison et al. | |
| 6,414,708 B1 | * | 7/2002 | Carmeli et al. | 348/66 |
| 6,424,321 B1 | | 7/2002 | Ronzani et al. | |
| 6,480,174 B1 | | 11/2002 | Kaufmann et al. | |

(Continued)

FOREIGN PATENT DOCUMENTS

| JP | 08237575 A | * | 9/1996 |
|---|---|---|---|
| JP | 09200650 A | * | 7/1997 |

(Continued)

OTHER PUBLICATIONS

Selker, Ted et al. "E-Windshield: a study of using." CHI EA '02: extended abstracts on Human factors in computer systems. ACM Press. Apr. 2002. 508-509.*

(Continued)

*Primary Examiner* — Jeffrey R Swearingen
(74) *Attorney, Agent, or Firm* — Adler Pollock & Sheehan P.C.; Daniel J. Holmander, Esq.; George N. Chaclas, Esq.

(57) ABSTRACT

The present invention provides a multi-view system containing a means for retaining multi-view system on a user's head. A frame support is pivotally connected to the means for retaining multi-view system. At least one display device, such as an LCD, is hingedly connected to the frame support. The display device is positioned away from the direct view of the user's eyes. In a preferred embodiment, the display device is positioned at least 3 degrees away from the direct view of the user's eyes. In operation, the user can see objects in direct view and the display device by moving the eyes to provide direct view and display device view capability.

3 Claims, 8 Drawing Sheets

(56) References Cited

U.S. PATENT DOCUMENTS

| | | |
|---|---|---|
| 6,816,314 B2 | 11/2004 | Shimizu et al. |
| 7,161,560 B2 | 1/2007 | Patterson |
| 7,173,765 B2 | 2/2007 | Yamasaki |
| 7,230,765 B2 | 6/2007 | Yamamoto |
| 2001/0030630 A1 | 10/2001 | Junk |
| 2002/0008677 A1 | 1/2002 | Saito |
| 2002/0171605 A1 | 11/2002 | Kim et al. |
| 2002/0190923 A1* | 12/2002 | Ronzani et al. ............... 345/50 |
| 2004/0008157 A1* | 1/2004 | Brubaker et al. ............... 345/8 |
| 2004/0008158 A1 | 1/2004 | Chi et al. |
| 2004/0113867 A1 | 6/2004 | Tomine et al. |
| 2005/0156816 A1 | 7/2005 | Repetto et al. |
| 2005/0162339 A1 | 7/2005 | Schneider |
| 2005/0206583 A1 | 9/2005 | Lemelson et al. |
| 2006/0037125 A1* | 2/2006 | McDowell ............... 2/209.13 |
| 2006/0061544 A1 | 3/2006 | Min et al. |
| 2006/0181482 A1 | 8/2006 | Iaquinto |
| 2006/0238550 A1 | 10/2006 | Page |
| 2007/0013611 A1 | 1/2007 | Nakabayashi et al. |
| 2007/0018908 A1 | 1/2007 | Nakabayashi et al. |
| 2007/0030211 A1 | 2/2007 | McGlone et al. |

FOREIGN PATENT DOCUMENTS

| | | |
|---|---|---|
| JP | 200522375 | 8/2005 |
| JP | 2007212577 A * | 8/2007 |
| WO | WO 9829775 A1 * | 7/1998 |

OTHER PUBLICATIONS

Najjar, Lawrence et al. "Using a wearable computer for continuous learning and support." Mobile Networks and Applications. vol. 4 Issue 1. Mar. 1999. Kluwer Academic Publishers. 69-74.*

Behar I., Wiley Roger W., Levine Richard R., Rash Clarence E., Walsh David J., Cornum Rhonda L. S., "Visual Survey of Apache Aviators (VISAA)", USAARL Report No. 90-15, Sensory Research Division, Sep. 1990.

Blake R., "A Neural Theory of Binocular Rivalry", Psychological Review, 1989, vol. 96, No. 1, 145-167.

Howard, Ian P., "Seeing in Depth", Basic Mechanisms, vol. 1 and Howard Ian P. and Rogers Brian J., :Seeing in Depth, Depth Perception vol. 2, Pub by I Porteous, Toronto, University of Toronto Press 2002.

Howard, Ian P., Rogers Brian J., "Binocular Vision and Stereopsis", Oxford Psychology Series No. 29, Oxford University Press 1995.

Lewandowski, Ronald J., Helmet-Mounted Displays II, SPIE-The International Society for Optical Engineering, vol. 1290 (1990).

Wenzel Brenda M., Castillo Anna R., Baker Gerry, "Assessment of the Virtual Environment Safe-For Maintenance Trainer (VEST)," United States Air Force Research Laboratory, Sep. 2002.

* cited by examiner

MULTI-VIEW SYSTEM

CROSS REFERENCE TO RELATED APPLICATION

This application is related to and claims priority from earlier filed provisional patent application Ser. No. 60/886,980, filed Jan. 29, 2007 and incorporated herein by reference.

BACKGROUND OF THE INVENTION

The present invention relates generally to displays. In particular, the present invention relates to electronic displays that can be used to view video from a video source, such as a surgical video microscope or a live camera feed of a patient during medical surgery. The present invention has particular application in viewing video of hard to view locations of a patient's body for dental, ophthalmic, oral, and endoscopic surgery.

In medicine and other fields, there is a need to view an object with a magnification and without magnification. There is particularly a need to have this capability concurrently in an ergonomic fashion. In the medical field, magnifying loupes, microscopes, digital microscopes, head mounted prisms and head mounted cameras have all been attempted in the prior art to address these issues.

In the medical field, camera and video displays have been employed by doctors to permit magnified and normal view of a patient. These devices are commonly used to display video from a video source, such as a live camera or playback media, such as DVD, videotape or computer video card output. A common video display is a computer monitor that can be a of a cathode-ray, LCD or plasma type, for example. Such a display is placed proximal to the user who desires to view the video content. In the case of a computing environment, the monitor is typically placed in front of the user and in behind the keyboard for ergonomic comfort and health reasons. In this environment, this fixed computer monitor enables the user to easily type on the keyboard and see what they are typing without large amount of head movement.

However, this arrangement is not suitable for viewing all types of video content. In the medical field, video cameras have played an important role in medicine to facilitate surgery, for example. More specifically, a high-powered camera can be placed very close to the part of the body being treated to visually aid the doctor during surgery and such treatment. It is currently well known to display such video content on a computer monitor that is close to the patient and the doctor so that the doctor can look back and forth at the video display and the patient. Depending on the surgery, the doctor may look more or less at the computer monitor that displays the video content from the camera. Due to the size and configuration of computer monitors, they can be placed only so close the patient without disrupting the surgery and interfering with the doctor and staff.

As a result, computer display devices in the surgical theatre require the doctor to frequently look away from the patient. The doctor must look down to view the patient in a normal mode and also must look up and away at the display device to view a video display, which, for example, is of a magnified view. This prior art arrangement, where the doctor is operating on a patient with their head posture compromised causes injuries, and the constant change of focal length is both disorienting and fatiguing.

There have been attempts in the prior art to provide a heads-up display, HMD, such as for use in the computer gaming industries. However, these heads-up displays are designed and configured so that the user's entire field of view is taken up by the video displays. This arrangement is meant to enhance a "virtual reality" view of the video content. This configuration is not suitable for use in a medical surgery environment because it requires the doctor to frequently put on and take off the heads-up display whenever they would like to switch from a normal view to video view or vice versa, and it disrupts the ability to function physically in the operating field, such has in the exchange of instruments.

Prior art also includes through the lens projection systems, which allow for the view of the direct field and the enhanced or data view. These through the lens or semi-transparent displays are most frequently, and appropriately, utilized in aviation, transportation and military applications. These users often require very rapid response to low resolution graphics. For example, an attack helicopter pilot may see a targeting curser or warning icon on their display. However, this obstruction of the normal view is unacceptable in surgery, where each view, magnified or not, must be of an extremely high level of acuity. The medical practitioner is generally not subject to the critical reaction times frequently encountered by military display users but is acutely in need of visually accurate, precise images.

In Human Factors, (Vol. 49, No 6, December 2007, pp. 1083-1096. DOI 10.1518/001872007X249947, Human Factors and Ergonomics Society.), a comprehensive review and analysis is provided of much of the published literature on the enduring problem of binocular rivalry that is relevant to the design and use of monocular and binocular head-worn displays (HWDs). These authors utilized a large body of scientific publications dealing with opaque and semi-transparent monocular and binocular head mounted display devices employed in a wide variety of experimental and field applications. Their belief is that the negative factors associated with current head mounted display devices have significantly limited their widespread acceptance and application.

When two eyes receive different stimulation on corresponding retinal areas, which precludes binocular fusion, a condition exists for creating a phenomenon known as binocular rivalry. Binocular rivalry refers to a state of competition between the eyes, such that one eye inhibits the visual processing of the other eye. The visibility of the images in the two eyes fluctuates, with one eye's view becoming visible while portions of the other eye's view are rendered invisible and suppressed, which reverses over time, causing perceptual confusion.

During binocular rivalry, portions of stimulation in one eye fail to gain access to higher visual processing stages or conscious awareness. During suppression, there is a general loss of sensitivity for all classes of stimuli that fall within the suppressed area of the retina. The loss of sensitivity can impair the ability of observers to visually guide attention to targets in the visual field.

Binocular rivalry is provoked by interocular differences in many kinds of image characteristics, such as contrast polarity, size, hue and motion velocity. These interocular differences are present in all, prior art, head mounted display devices, to a greater or lesser degree. See Blake, R., A Neural Theory of Binocular Rivalry, Psychological Review, 96, 145-167 (1989); Breese, B., On inhibition Psychological Monographs, 3, 1-65(1899); Howard, I., Seeing in depth: Vol. 1. Basic Mechanisms, New York: I. Porteous (2002); Howard, I. and Rogers, B., Binocular vision and stereopsis, New York: Oxford University Press (1995), and Levelt, W., On binocular rivalry, Soesterberg, Netherlands: Institute for Perception, RVO-TNO (1965).

Additionally, in the prior art, monocular and binocular head mounted display devices often cause numerous and similar negative effects on the user. For example, Wenzal et al., Assessment of the virtual environment safe-for-maintenance trainer, Mesa, Ariz., Air Force Research Laboratory (2002) found that aircraft maintenance workers reported problems such as eyestrain, headache, nausea and dizziness when a HMD was use. In a study by Behar et al., Visual survey of Apache aviators, (VISAA), Fort Rucker, Ala.: U.S. Army Aeromedical Research Laboratory (1990), a large number of helicopter pilots reported at least one visual complaint, such as visual discomfort, headache, blurred or double vision associated with flying an aircraft with an integrated helmet and display sighting system, a monocular transparent head mounted display device. Moreover, Rash et al., Human factors and safety considerations of night vision systems flight using thermal imaging systems, Proceedings of SPIE: Helmet-Mounted Displays II, 1290, 142-164, (1990) reported difficulty making the necessary attention switches between the eyes.

Therefore, there is a need for a multi-view system that is ergonomic, provides good head posture for the user and allows an unrestricted range of practitioner location. There is a need for a system where the user has a gaze selected video (e.g. magnified) view and a normal view available at all times with ergonomically correct head posture and correct optical/visual characteristic balance.

BRIEF SUMMARY OF THE INVENTION

An embodiment of the present invention preserves the advantages of prior art heads-up displays. In addition, it provides new advantages not found in currently available heads-up displays and overcomes many disadvantages of such currently available heads-up displays.

The present invention is a multi-view system which contains a means for retaining the system on a user's head. A frame support is pivotally connected to the means for retaining the system on the user's head. At least one display device, such as an LCD, is hingedly connected to the frame support. The display device is preferably positioned away from the direct view of the user's eyes. A transparent member may be positioned about the direct view of the user's eyes. In one embodiment, the display device is positioned at least three degrees upward from the direct view of the user's eyes. As a result, the user can see objects in direct view or normal view and at least one display device by moving the eyes to provide direct view and display device view capability.

The multi-view system has more than one embodiment which results in the user having normal or direct view and display device view capability. In another embodiment of the present invention, the display device is positioned downward from the direct view of the user's eyes. In this embodiment, the transparent member is about the direct view of the user but positioned above the display device. In a further embodiment of the present invention, two display devices are positioned sideward from the direct view of the user's eyes. In this embodiment, the transparent member is about the direct view of the user but positioned in between two display devices.

It is therefore an object of the present invention to provide a multi-view system where at least one display device is positioned away from the direct view of the user's eyes.

It is a further object of present invention to provide an ergonomic multi-view system which provides good head posture for the user and allows an unrestricted range of doctor location.

Another object of the present invention is to provide a multi-view system where the user can see objects in direct view and at least one display device by moving the eyes to provide direct view and display device capability.

Also, another object of the present invention is to eliminate the many negative issues associated with binocular rivalry.

Other objects, features and advantages of the invention shall become apparent as the description thereof proceeds when considered in connection with the accompanying illustrative drawings.

BRIEF DESCRIPTION OF THE DRAWINGS

The novel features which are characteristic of the multi-view system are set forth in the appended claims. However, the multi-view system, together with further embodiments and attendant advantages, will be best understood by reference to the following detailed description taken in connection with the accompanying drawings in which:

DETAILED DESCRIPTION OF PREFERRED EMBODIMENTS

Referring to FIGS. 1-7, the present invention provides a new and novel multi-view system 10 that is vastly improved over prior art heads-up displays. The multi-view system 10 of the present invention has at least one display device 20, such as an LCD, positioned away from the direct view of the user as shown. The multi-view system 10 allows the user to have a normal or direct view and a display device view available at all times by moving a user's eyes or gaze. The present invention addresses the problem of repetitive physical injuries due to movement of a user's head when viewing and looking away from a display device, such as a video monitor, and binocular rivalry.

Figure 1:
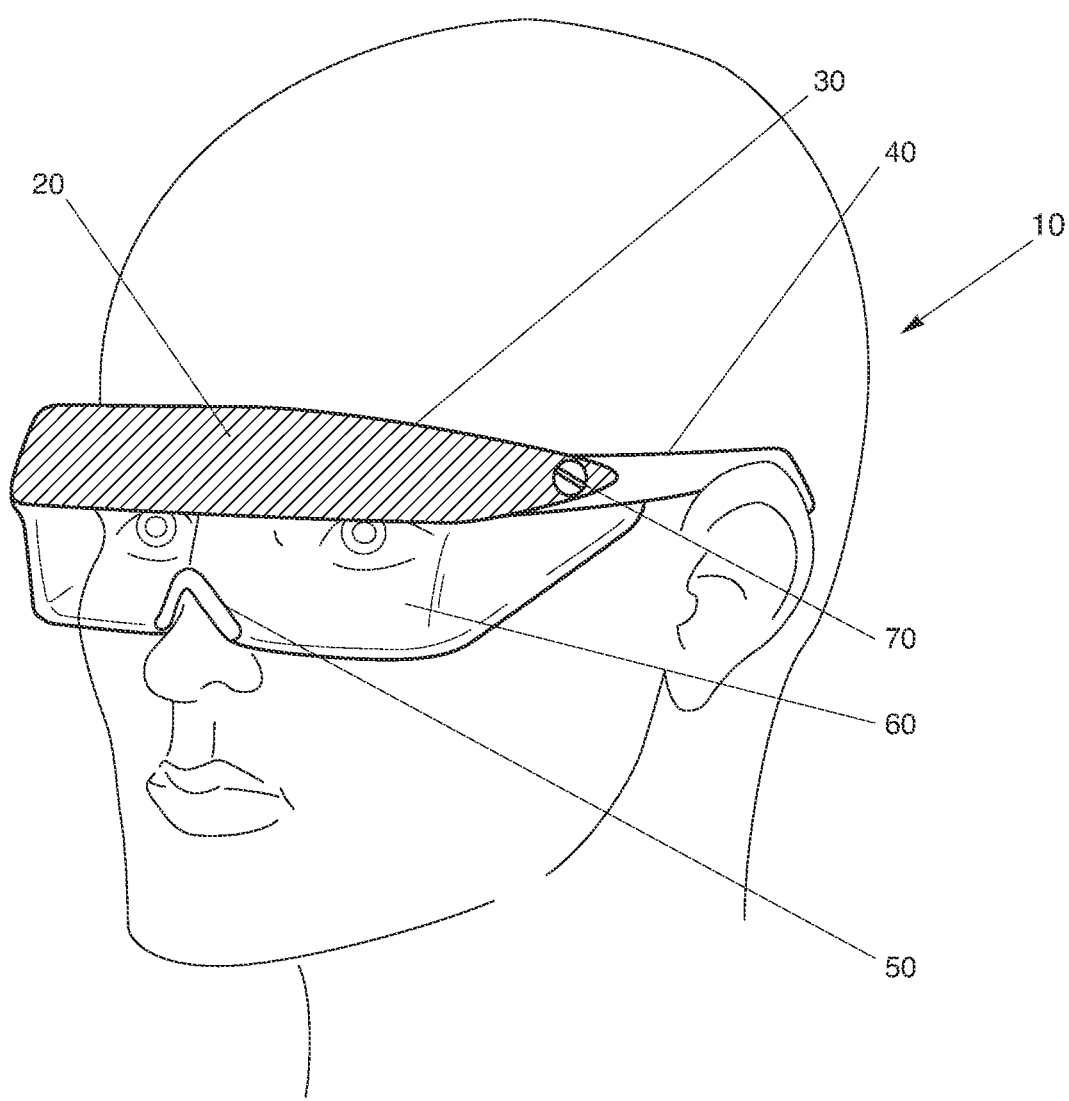
FIG. 1 is a perspective view of the present invention with a display device positioned upward of the direct view of the user.

Referring to FIG. 1, the multi-view system 10 contains at least one display device 20, a frame support 30, and a means for retaining the multi-view system 40. The means for retaining the multi-view system 40 on the user's head can be a head band, eyeglasses, goggles, ear bows, ear piece or any other structure for retaining the multi-view system 10 on the user's head. The means for retaining 40 should have sufficient strength to retain the weight of the system including the display device 20.

The display device 20 provides visual information about a target site, especially useful during operative procedures. For example, the display device 20 is a video display, such as a video monitor. Specifically in a dental or medical office, a video monitor is used in a close circuit system. However, it should be appreciated that any display device 20 known in the prior art that is opaque may be used as the display device 20. An LCD (Liquid Crystal Display) is an example of one type of opaque display device 20 meaning it is not transparent to the user. Of course, the display device 20 must be of a size and dimension suitable for retaining on a user's head. As a result, the user can see objects in direct view and at least one display device 20 by moving the eyes to provide direct view and display device capability.

Figure 2:
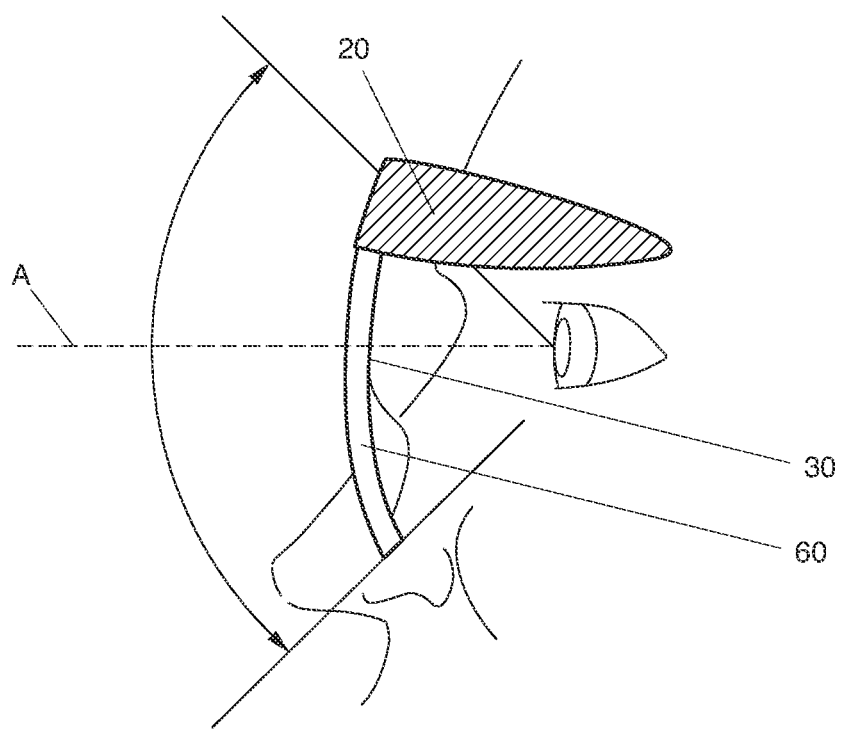
FIG. 2 is a side view of the present invention of FIG. 1.

Referring to FIG. 2, a side view of the present invention of FIG. 1 is shown. The display device 20 is positioned away from the direct view of the user's eyes. The display device 20 is positioned above the direct view of the user as defined along an axis A. In a preferred embodiment, the display device 20 is positioned at least three degrees upward from the direct view of the user's eyes. The display device 20 may also be positioned greater than three degrees and less than thirty degrees away from the direct view of the user's eyes. Of course, the display device 20 can be positioned at least 30 degrees away from the direct view of the user's eyes.

Thus, the user can view directly ahead without the display device 20 in front of them so they can directly see the patient or object in a normal fashion. It is also possible that the user can wear their own vision correcting glasses, safety glasses, loupes and other standard eyewear while wearing the multi-view system 10. As a result, even when the multi-view system 10 is worn by a user, the user can view the patient as they do without the device in place.

Still referring to FIG. 2, a transparent member 60 is attached to the frame support 30 about the direct view of the user's eyes. The transparent member 60 may be transparent glass or plastic used for protection, safety, or visual aid—such as material used in prescription glasses. A transparent member 60 is positioned about the direct view of the user in direct contrast to the display device 20. It should be noted that a transparent member 60 may be removed from the frame support 30 to provide a direct view of a target area without the transparent member 60 in between.

Figure 3A:
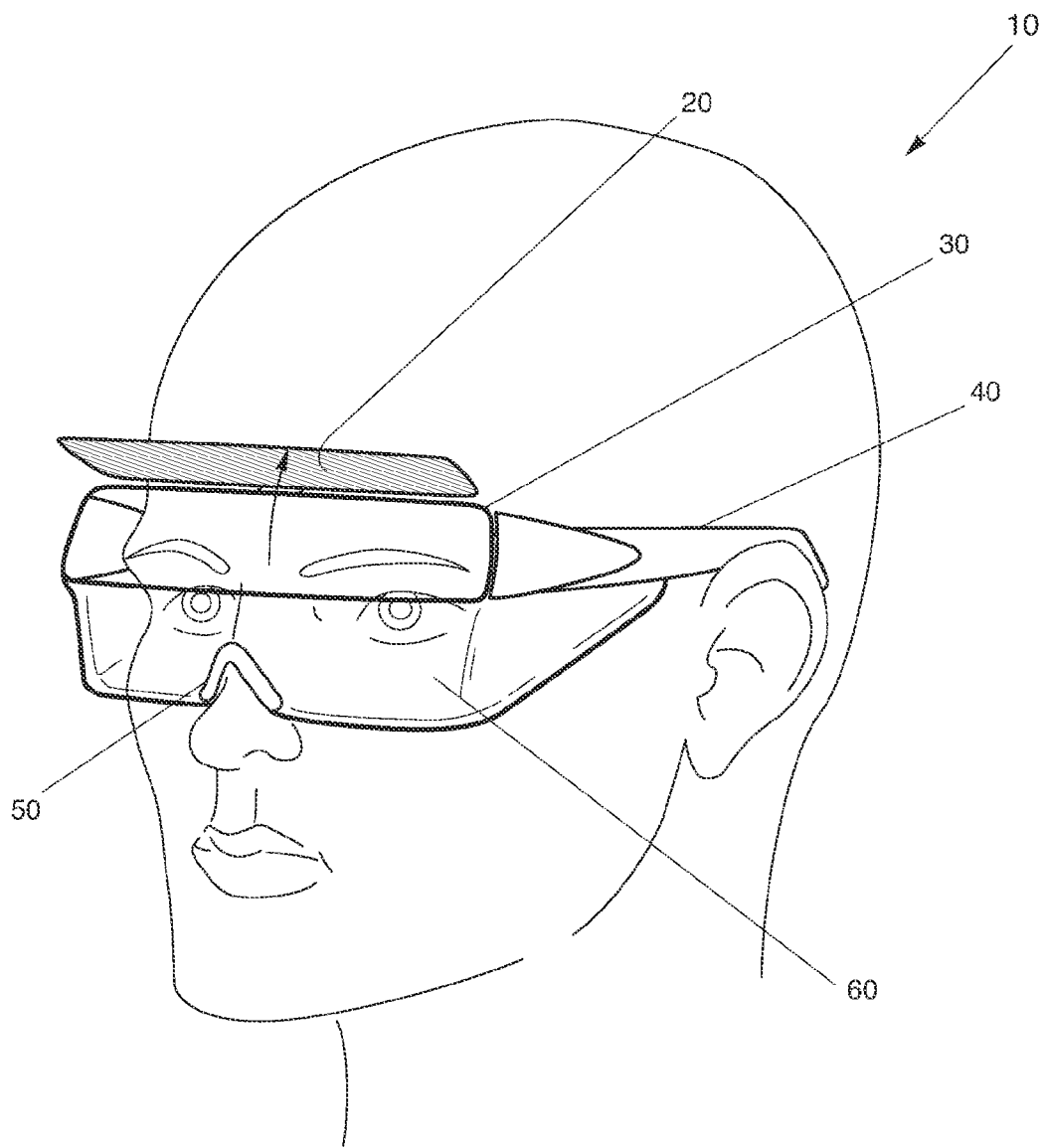
FIG. 3A is a perspective view of the present invention of FIG. 1 showing movement of the display device relative to frame support.

Referring to FIG. 3A, the display device 20 is hingedly connected to the frame support 30 so that the angle of the display device 20 relative to the user's direct view can be changed, as desired. The display device 20 is capable of adjusting in any direction so long as the display device is 20 is away from the direct view of the user. Note, one or more display devices 20 may be positioned on the frame support 30 either hingedly attached or fixed. The display device 20 may be hingedly attached to the frame support 30 using means known in the art.

Figure 3B:
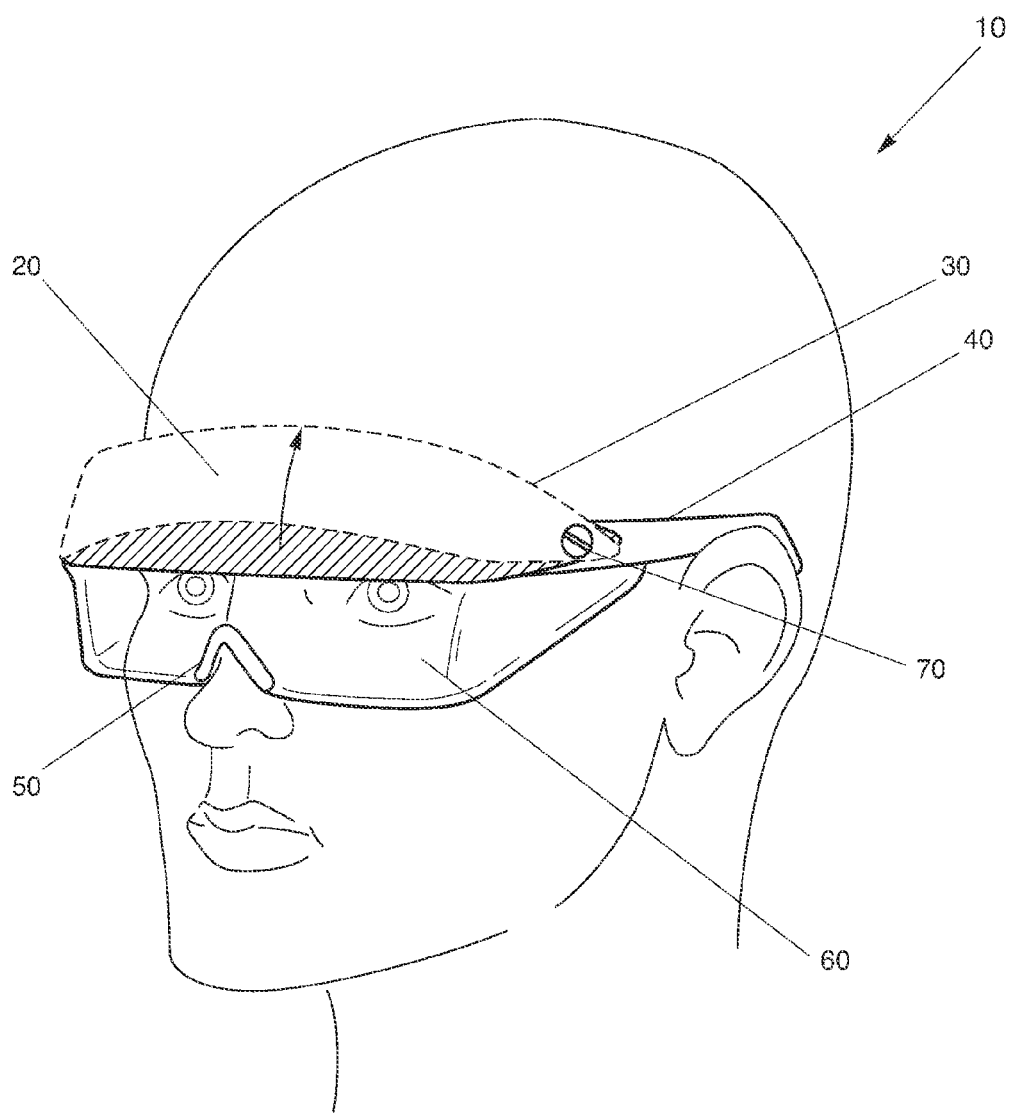
FIG. 3B is a perspective view of the present invention of FIG. 1 showing upward movement of the frame support.

Referring to FIG. 3B, the frame support 30 is pivotally connected to the means for retaining the multi-view system 40 on the user's head. More importantly, the frame support 30 is positioned relative to the means for retaining 40 so that the display device 20 attached to the frame support 30 is positioned away from the direct view of the user's eyes. The frame support 30, in one embodiment, contains a pivot 70 which facilitates the movement of the frame support 30 relative to the means for retaining 40 so long as the display device is positioned away from the direct view of the user's eyes. Alternatively, the frame support 30 is fixedly attached to the means for retaining 40. As an added feature, a nose bridge 50 may also attached to the frame support 30 to provide additional stability and comfort.

Figure 4:
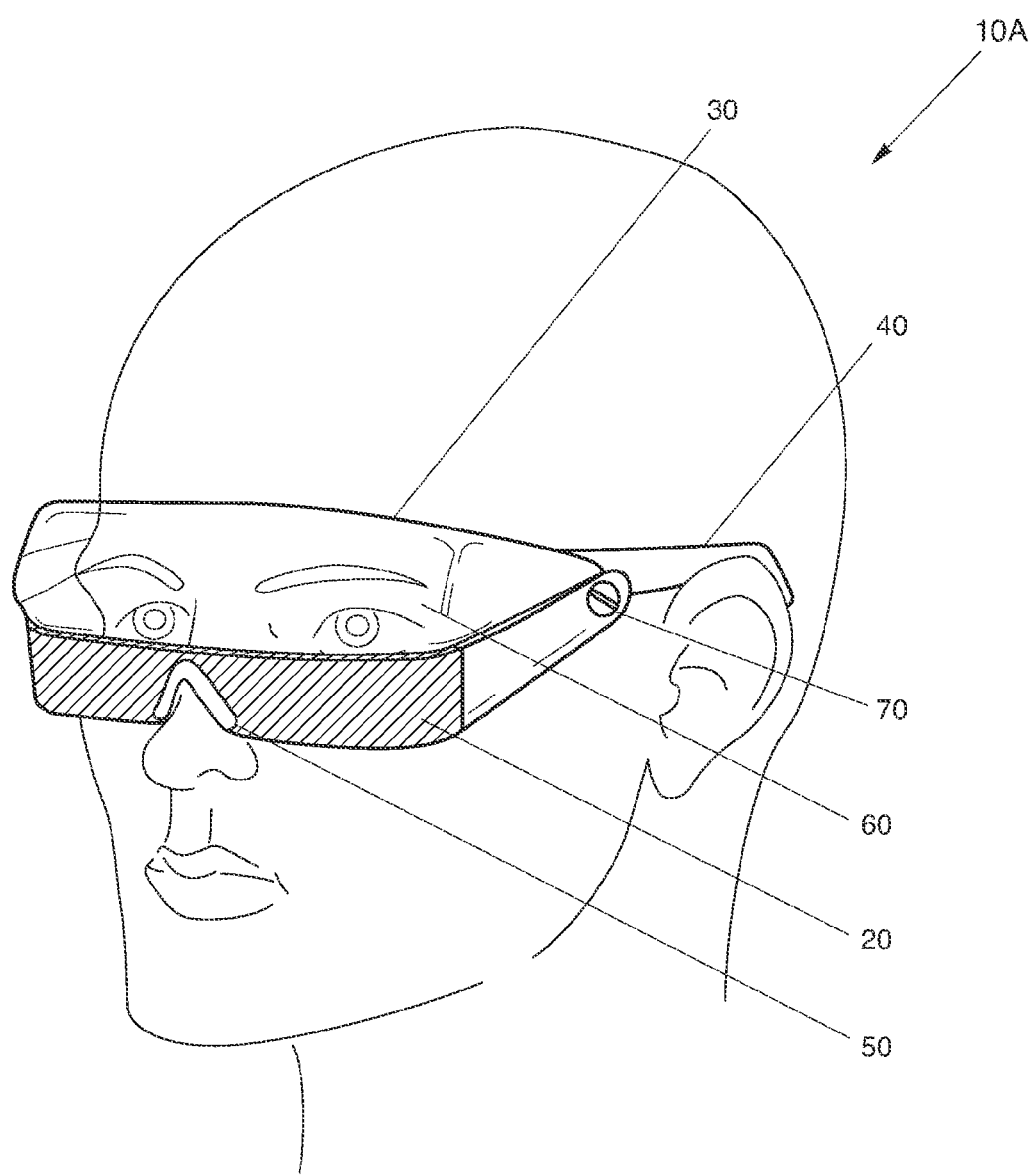
FIG. 4 is a perspective view of the present invention with a display device positioned downward of the direct view of the user.
Figure 5:
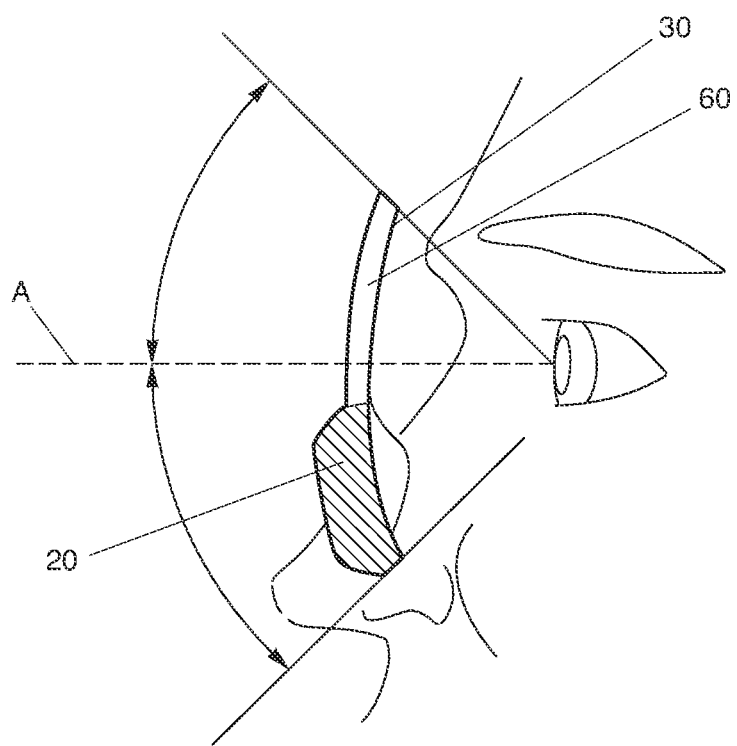
FIG. 5 is a side view of the present invention of FIG. 4.

Now referring to FIG. 4, another embodiment of the multi-view system 10A is shown. The multi-view system 10A of FIG. 4 is similar to multi-view system 10 of FIG. 1 including the function and features except for positioning of the display device 20. In the multi-view system 10A, the display device 20 is positioned downward from the direct view of the user's eyes. In this embodiment, the transparent member 60 is about the direct view of the user but positioned above the display device 20. As shown in FIG. 5, the display device 20 is positioned downward or below the user's direct view shown along the axis A.

Figure 6:
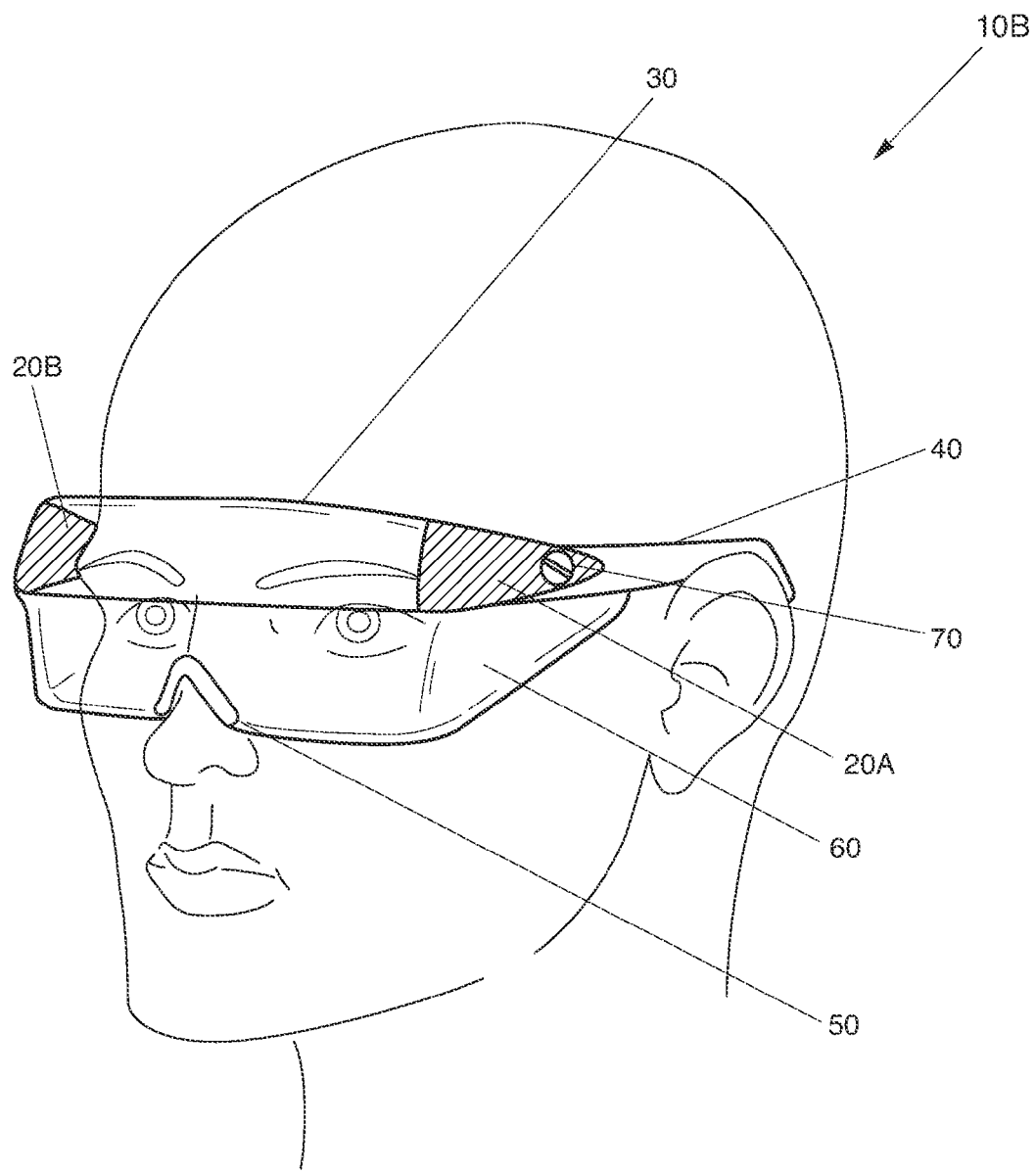
FIG. 6 is a perspective view of the present invention with two display devices positioned sideward of the direct view of the user.
Figure 7:
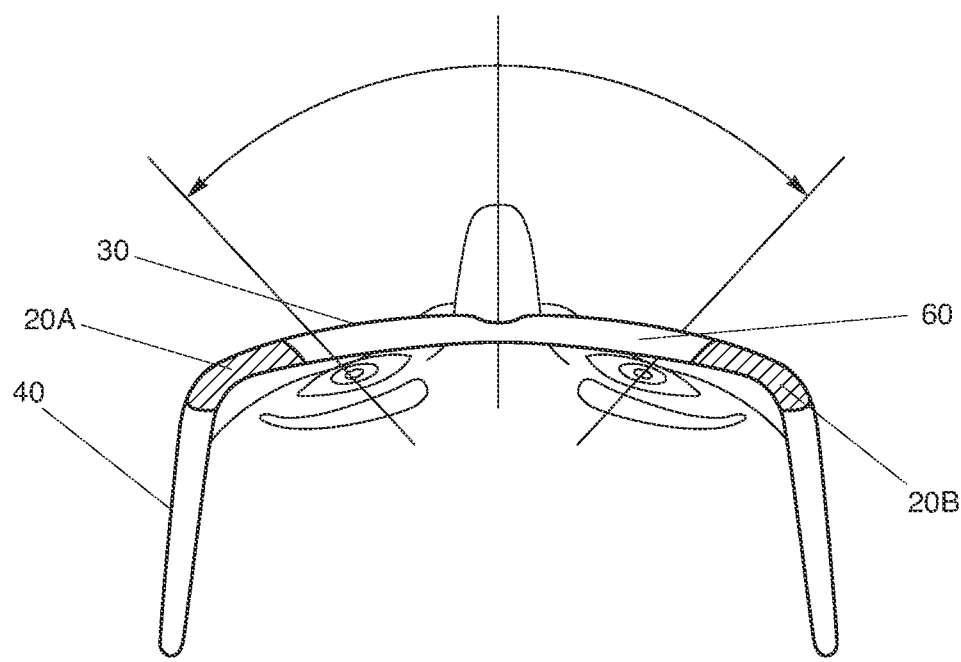
FIG. 7 is a top view of the present invention of FIG. 6.

Now referring to FIG. 6, a further embodiment of the multi-view system 10B is shown. The multi-view system 10B of FIG. 6 is similar to multi-view system 10 of FIG. 1 in function and features except for positioning and number of the display devices 20. In the multi-view system 10B, two display devices 20A, 20B are positioned sideward from the direct view of the user's eyes. In this embodiment, the transparent member 60 is about the direct view of the user but positioned in between or below the two display devices 20A, 20B. As shown in FIG. 7, the display devices 20A, 20B are positioned sideward of the user's direct view shown along the axis A. It should be noted that one display device or more may positioned sideward of the direct view of the user's eyes.

In operation of the multi-view system 10, when the user desires to view a display device 20 (e.g. magnified view), the user looks away from their direct or normal view of their eyes while keeping their head in the same posture as when viewing directly at the patient or object. This obviates the need for the user to constantly move their head when changing their view from a direct view to viewing the display devices. As can be understood, this invention preserves head posture to, in turn, enhance the overall ergonomics of using both direct view and a display device-aided view. The invention naturally enables the user to use their normal head posture but also gain the benefit of being able to view display device content.

Additionally, the unique orientation of the multi-view system 10 eliminates the many negative issues associated with binocular rivalry. By using the present invention, the user accepts the normal or direct view naturally and must consciously select the display device by shifting their gaze. The display device 20 optimizes adjustable visual image characteristics like brightness, hue, refresh rate, etc. The multi-view system 10 eliminates the nausea, dizziness, disorientation, oculomotor strain and vestibular-visual cue conflict found in prior art systems.

It should be understood that the present invention is well-suited and preferably used in a dental, ophthalmic and medical surgical operatory and office environment. In fact, the present invention may be used in any environment that requires a magnified view of an object, or additional digital data, such as circuit board construction for sorting and inspection. The invention will be disclosed herein in connection with use in a dental office environment. However, the present invention is not intended to be limited to that particular use or environment.

In addition, a power source (not shown) for the display device 20 may be internal to the display device 20 or external to the display device 20. In one embodiment, the power source is a lithium battery positioned inside the display device 20. It is also contemplated that the display device 20 is connected wirelessly or by a cable to an external computer or server. Alternatively, the display device 20 may have an internal computer or otherwise attached to the multi-view system 10.

In view of the foregoing, a new and novel improved multi-view system 10 is provided. The multi-view system 10 adds the new and unique feature of the display device 20 along with the normal direct view. By using the multi-view system 10, the user can see objects in direct or normal view and at least one display device 20 by moving the eyes or gaze to provide direct view and display device view capability. The ergonomic multi-view system 10 also reduces the motion of user's head to view a display device resulting in more comfort and less repetitive injuries to the user.

Therefore, while there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A multi-view system, comprising:
   a means for retaining multi-view system on a user's head;
   a frame support connected to the means for retaining multi-view system on the user's head;
   at least one display device is connected to the frame support in a position at least 3 degrees upwardly away from the direct view of the user's eyes;
   wherein the frame support is fixedly attached to the means for retaining multi-view system on the user's head, and
   whereby the user can see objects in direct view and at least one display device by moving the eyes to provide direct view and display device view capability.

2. A multi-view system, comprising:
   a means for retaining multi-view system on a user's head;
   a frame support connected to the means for retaining multi-view system on the user's head;
   at least one display device is connected to the frame support in a position at least 3 degrees upwardly away from the direct view of the user's eyes;
   wherein the at least one display device is fixedly attached to the frame support to provide the display device at a fixed angle of 3 degrees upwardly away from the direct view of the user's eyes, and
   whereby the user can see objects in direct view and at least one display device by moving the eyes to provide direct view and display device view capability.

3. A multi-view system, comprising:
   a means for retaining multi-view system on a user's head;
   a frame support connected to the means for retaining multi-view system on the user's head;
   at least one display device is connected to the frame support in a position at least 3 degrees upwardly away from the direct view of the user's eyes;
   wherein the at least one display device is fixed in a position at least 3 degrees upwardly away from the direct view of the user's eyes, and
   whereby the user can see objects in direct view and at least one display device by moving the eyes to provide direct view and display device view capability.

* * * * *